(12) United States Patent
Price et al.

(10) Patent No.: US 11,483,785 B2
(45) Date of Patent: Oct. 25, 2022

(54) BLUETOOTH SPEAKER CONFIGURED TO PRODUCE SOUND AS WELL AS SIMULTANEOUSLY ACT AS BOTH SINK AND SOURCE

(71) Applicant: EAGLE ACOUSTICS MANUFACTURING, LLC, Mundelein, IL (US)

(72) Inventors: Steven Price, Grayslake, IL (US); Leonard Foxman, Highland Park, IL (US); Jake Maciejewski, Vernon Hills, IL (US); Peter Alexander Tomich, Ingleside, IL (US)

(73) Assignee: Trulli Engineering, LLC, Mundelein, IL (US)

( * ) Notice: Subject to any disclaimer, the term of this patent is extended or adjusted under 35 U.S.C. 154(b) by 0 days.

(21) Appl. No.: 17/134,966

(22) Filed: Dec. 28, 2020

(65) Prior Publication Data
US 2021/0120509 A1    Apr. 22, 2021

Related U.S. Application Data

(63) Continuation-in-part of application No. 16/521,037, filed on Jul. 24, 2019, now Pat. No. 10,915,292.
(Continued)

(51) Int. Cl.
*H04W 56/00* (2009.01)
*H04W 4/80* (2018.01)
(Continued)

(52) U.S. Cl.
CPC ............ *H04W 56/001* (2013.01); *H04R 3/12* (2013.01); *H04W 4/80* (2018.02); *H04R 2420/07* (2013.01); *H04W 76/15* (2018.02)

(58) Field of Classification Search
CPC ....... H04S 7/00; G06F 3/165; H04R 2420/03; H04W 56/001
(Continued)

(56) References Cited

U.S. PATENT DOCUMENTS

| 1,707,570 A | 4/1929 | Rice |
| 6,990,453 B2 | 1/2006 | Wang et al. |

(Continued)

*Primary Examiner* — Yosef K Laekemariam
(74) *Attorney, Agent, or Firm* — Clark Hill PLC; James R. Foley

(57) ABSTRACT

A portable speaker, such as a subwoofer, that is configured to pair via Bluetooth from any device capable of streaming Bluetooth audio and act as the "sink." The portable speaker is also configured to pair via Bluetooth to other audio equipment capable of streaming Bluetooth audio and act as the "source." The portable speaker is also preferably configured to synchronize the audio signal going to the portable speaker and the other unit playing music, such that the user will not hear delays between the two units playing the audio stream. Preferably, the portable speaker is configured to be portable in which the size and weight is small enough for a person to carry, and is portable in which it operates with rechargeable batteries inside the unit, thus not needing any other power source such as AC outlet, or automobile power system. Another embodiment omits the speaker and instead provides a line out for connection to an external speaker, such as a subwoofer.

18 Claims, 4 Drawing Sheets

Related U.S. Application Data

(60) Provisional application No. 62/703,319, filed on Jul. 25, 2018.

(51) Int. Cl.
*H04R 3/12* (2006.01)
*H04W 76/15* (2018.01)

(58) Field of Classification Search
USPC ............... 381/26, 55, 58, 77, 85, 111, 311
See application file for complete search history.

(56) References Cited

U.S. PATENT DOCUMENTS

| | | |
|---|---|---|
| 7,742,740 B2 | 6/2010 | Goldberg et al. |
| 8,996,380 B2 | 3/2015 | Wang et al. |
| 9,916,840 B1 | 3/2018 | Do et al. |
| 9,949,054 B2 | 4/2018 | Kadri et al. |
| 10,043,536 B2 | 8/2018 | Tcheng |
| 10,209,953 B2 | 2/2019 | Millington |
| 2013/0253678 A1 | 9/2013 | Katz et al. |
| 2014/0003625 A1 | 1/2014 | Sheen et al. |
| 2017/0094437 A1 | 3/2017 | Kadri et al. |
| 2018/0115827 A1* | 4/2018 | Tanaka ............... H04S 7/00 |
| 2019/0179597 A1* | 6/2019 | Tull ............... G06F 3/165 |

* cited by examiner

Portable Solution

Existing Application

Automotive Solution

Cross Correlation for Synchronization

Cross Correlation with Unfavorable Confidence

BLUETOOTH SPEAKER CONFIGURED TO PRODUCE SOUND AS WELL AS SIMULTANEOUSLY ACT AS BOTH SINK AND SOURCE

RELATED APPLICATION PRIORITY CLAIM

This application is a continuation-in-part of U.S. patent application Ser. No. 16/521,037, filed Jul. 24, 2019, which claims the benefit of U.S. Provisional Application Ser. No. 62/703,319, filed Jul. 25, 2018. Application Ser. No. 16/521,037 and Ser. No. 62/703,319 are hereby incorporated by reference in their entirety.

BACKGROUND

The present invention generally relates to wireless speakers, and more specifically relates to a Bluetooth speaker, such as a subwoofer, that is configured to receive a Bluetooth signal, output sound, and connect via Bluetooth to an audio system, such as another Bluetooth speaker or the audio system of a vehicle.

Personal audio is a significant growing market mainly driven by the ease of use and portability of Bluetooth speakers whereby users can stream audio from their mobile phones to these devices. In most cases, these portable Bluetooth speakers do not provide sufficient bass frequencies to give the user a more "fuller" sound quality like a home theater system with a subwoofer.

Portable Bluetooth speakers generally have difficulty providing low frequencies (20-200 Hz) at the same level of mid to high frequencies (200-20 kHz). This is primarily due to the size of the loudspeakers which cannot move the necessary volume of air to generate low frequencies in this range (20-200 Hz). Another reason is the size of portable Bluetooth speakers. To produce the same level of sound as the mid and high frequencies, the loudspeaker(s) inside the device require a much larger sized enclosure which could substantially increase the original size and weight.

Many OEM automobile stereo systems in the market today provide Bluetooth connectivity as a standard option. Subwoofers are not a common standard option for the stereo system, thus low frequency output levels are not optimal for a "full sound". It is believed automotive manufactures do not provide subwoofers as standard options because subwoofers add cost, weight, and space requirements to the overall automobile design.

Aftermarket solutions are available to complement an automotive stereo system whereby the consumer would have to install a subwoofer by themselves or use a professional service because it usually requires dismantling portions of the automobile to route cables and install 3rd party electronics such as an amplifier. To many automobile owners, they do not have the experience or knowledge for installing aftermarket electronics, or do not want to pay the high costs for installation fees. In most cases when leasing an automobile, manipulating the automobile with aftermarket electronics will violate the lease agreement.

There are solutions that exist which can connect multiple wireless speakers for audio play including subwoofers, but they only work by the same manufacturer that was specifically designed to do as such. These products are incapable to connect to a competitor product as an example.

Existing subwoofers are not considered "portable", nor are they designed as such. Subwoofers are generally too heavy and large to be considered portable. Additionally, subwoofers are powered from an AC outlet, or by being hard-wired in an automobile to receive 12-16V.

A need exists to provide better bass for audio systems that is portable, battery powered, and easy to connect to existing third party Bluetooth audio systems. Users of this technology will have the ability to pair this subwoofer device to their existing Bluetooth speakers, their car audio system provided it is Bluetooth enabled, or any other Bluetooth audio systems without the need for professional installation.

SUMMARY

An object of an embodiment of the present invention is to provide a Bluetooth speaker, such as subwoofer, that is configured to receive a Bluetooth signal, produce sound, and connect via Bluetooth to an audio system, such as to a Bluetooth speaker, vehicle audio system, home theater system, or Smart TV.

Another object of an embodiment of the present invention is to provide a device that can receive a Bluetooth signal, such as from a smart phone or other device, play sounds through at least one speaker of the device, and wirelessly transmit signals, via Bluetooth, to an audio system, such as another speaker or the audio system of a vehicle.

Briefly, an embodiment of the present invention provides a device that comprises a Bluetooth signal receiver, a signal processor, at least one speaker, and a Bluetooth signal transmitter. The device is configured to receive a Bluetooth signal using the Bluetooth signal receiver, process the signal using the signal processor, emit sounds using the at least one speaker, and transmit a Bluetooth signal using the Bluetooth signal transmitter.

A preferred embodiment of the present invention comprises a portable, battery-operated Bluetooth subwoofer comprising a Bluetooth signal receiver configured to receive a wireless Bluetooth signal, a signal processor configured to receive a digital audio signal from the Bluetooth signal receiver, a Bluetooth signal transmitter configured to receive signals from the signal processor and wirelessly transmit a Bluetooth signal, a digital audio buffer configured to receive signals from the signal processor, at least one microphone, synchronizing circuitry configured to receive signals from both the at least one microphone and the digital audio buffer, an amplifier, said digital audio buffer configured to receive signals from the synchronizing circuitry and provide signals to the amplifier, said amplifier being configured to drive said at least one speaker to produce sound. At least one user-interactive control may be provided as being connected to the signal processor that is adjustable by a user.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
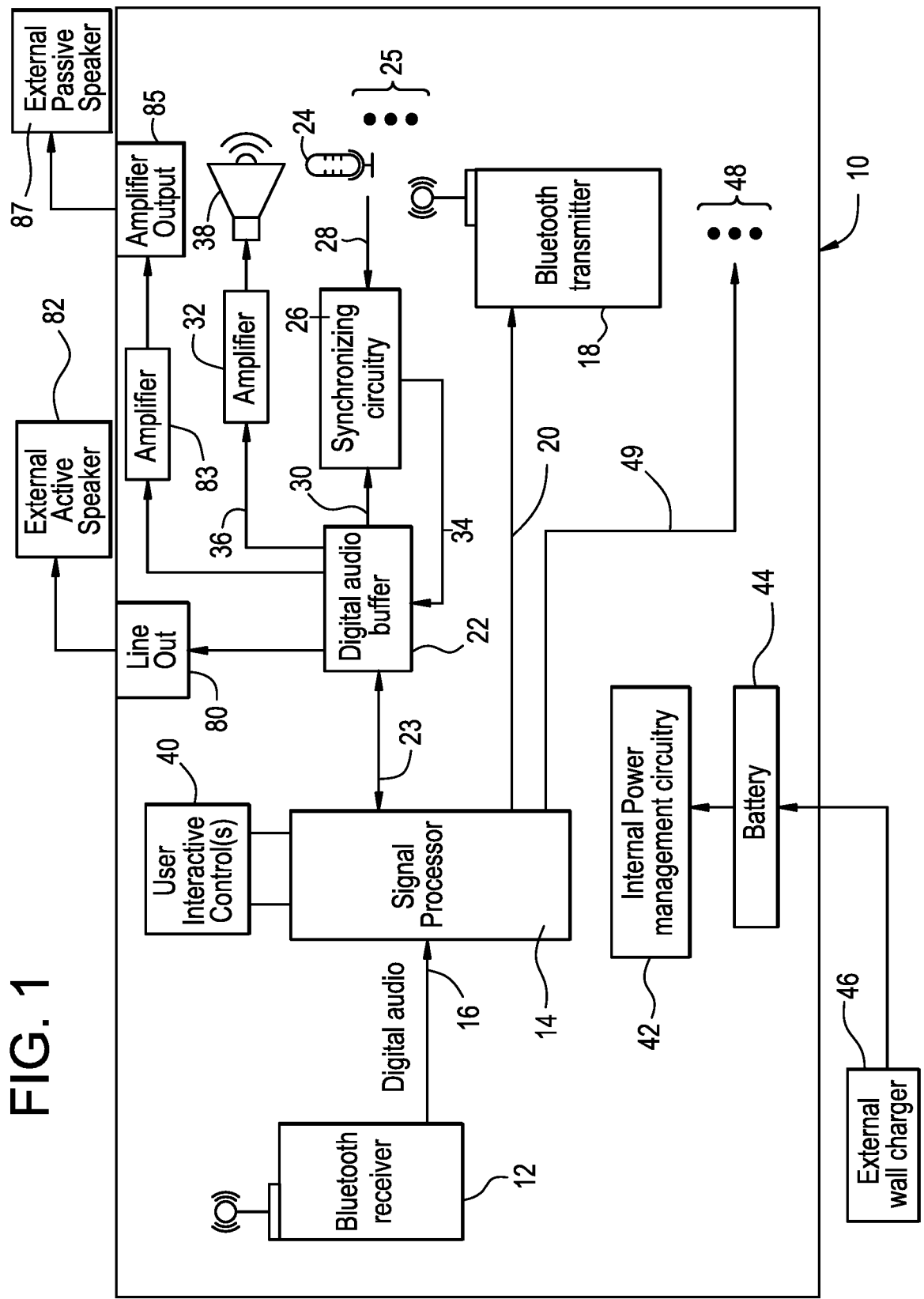
FIG. 1 is a block diagram of a portable, battery-operated Bluetooth subwoofer that is in accordance with a preferred embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 is a block diagram of a device that is configured to receive a wireless signal, produce sound, and connect wirelessly to an audio system, such as another speaker or the audio system of a vehicle. Specifically, a preferred embodiment of the present invention is shown, wherein the device comprises a portable, battery-operated Bluetooth subwoofer 10 that is in accordance with a preferred embodiment of the present invention.

As shown, the portable, battery-operated Bluetooth subwoofer 10 comprises at least one wireless sink, such as a Bluetooth signal receiver 12. The Bluetooth signal receiver 12 is configured to receive a wireless signal, such as a Bluetooth signal from a mobile phone. As such, music, for example, can be sent wirelessly from the mobile phone to the subwoofer 10. The subwoofer 10 includes a signal processor 14 (such as a Digital Signal Processor (DSP)) that is configured to receive a digital audio signal 16 from the Bluetooth signal receiver 12. The subwoofer 10 also includes at least one wireless source, such as a Bluetooth signal transmitter 18 that is configured to receive signals 20 from the signal processor 14 and wirelessly transmit a Bluetooth signal, i.e., to an audio system, such as to another speaker (as shown in FIG. 3, described more fully later hereinbelow) or to the audio system of a vehicle (as shown in FIG. 5, described more fully later hereinbelow).

As shown in FIG. 1, the subwoofer 10 also preferably includes a digital audio buffer 22 that is configured to receive signals 23 from the signal processor 14, at least one microphone 24, and synchronizing circuitry 26 that is configured to receive signals 28, 30 from both the at least one microphone 24 and the digital audio buffer 22. An amplifier 32 is preferably provided and the digital audio buffer 22 is configured to receive signals 34 from the synchronizing circuitry 26, provide signals 36 to the amplifier 32, and the amplifier 32 is configured to drive at least one speaker 38 to produce sound.

As shown in FIG. 1, at least one user-interactive control, such as one or more knobs and/or switches 40, may be provided as being connected to the signal processor 14, wherein the at least one user-interactive control is adjustable by user, for example, to set the crossover frequency, phase, etc., wherein such controls are common user adjustments in subwoofer applications. Furthermore, the portable, battery-operated Bluetooth subwoofer 10 may include one or more inputs, lights, buttons, etc. which are standard in the industry and therefore have been omitted from the drawings, for clarity.

Figure 3:
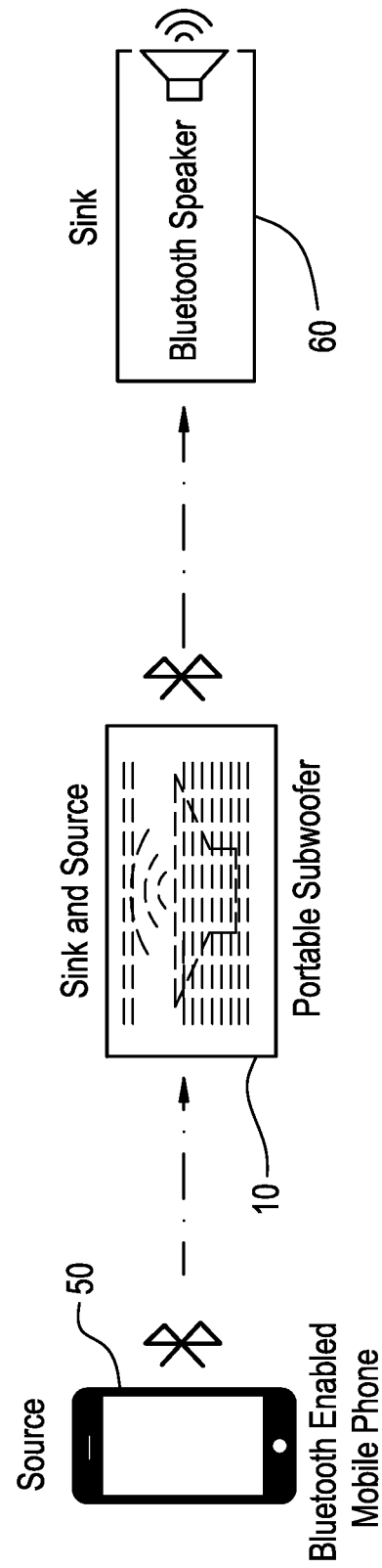
FIG. 3 is similar to FIG. 2, but depicts the device of FIG. 1 being used in the same application.
Figure 5:
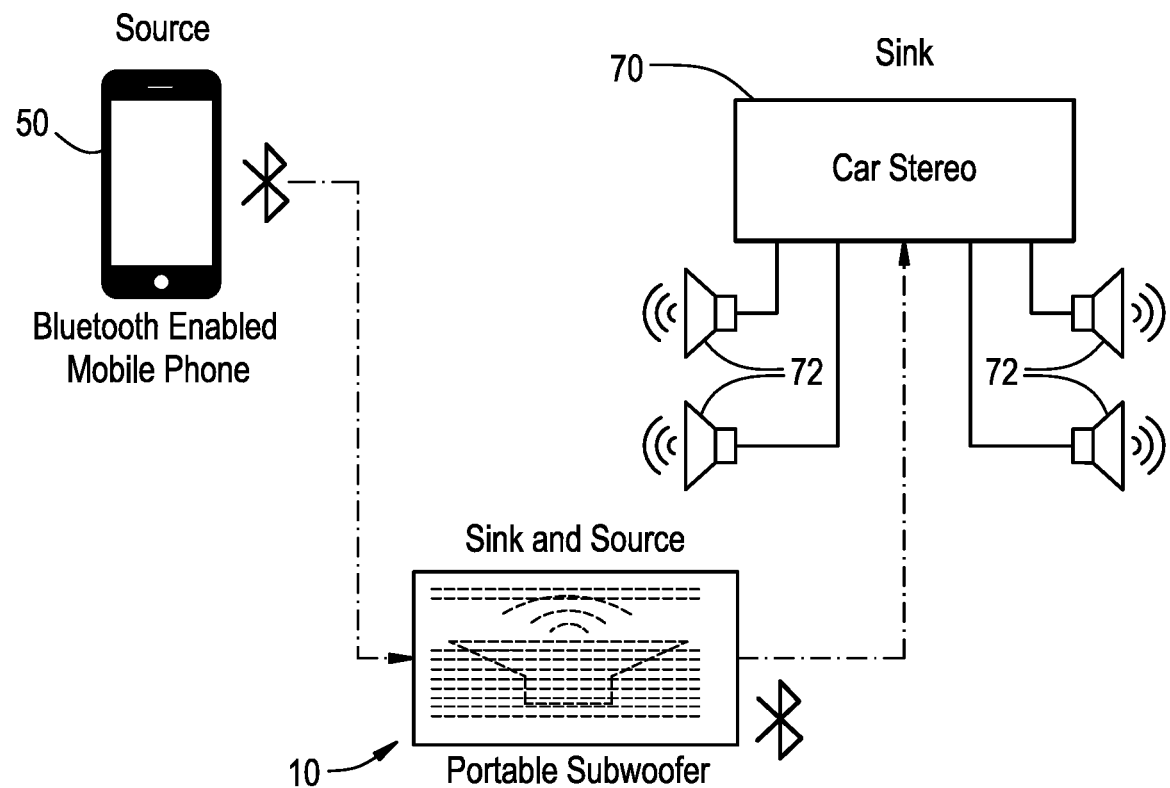
FIG. 5 is similar to FIG. 4, but depicts the device of FIG. 1 being used in the same application.

Preferably, the signal processor 14 is configured to effectively feed the low frequencies to the digital audio buffer 22 for eventual output via the at least one speaker 38, and is configured to feed mid and high frequencies to the Bluetooth signal transmitter 18 which is paired to another audio system such as another speaker (as shown in FIG. 3, described more fully later hereinbelow) or the audio system of a vehicle (as shown in FIG. 5, described more fully later hereinbelow), which plays the mid and high frequencies.

Regardless, in order to calibrate (or synchronize) the low frequencies to the other audio system, preferably the subwoofer 10 is configured to use the at least one microphone 24 which feeds the signal 28 back into the synchronizing circuitry 26. The synchronizing circuitry 26 is configured to determine the overall delay and point to the memory address in the digital audio buffer 22 as to where the low frequency digital audio signal 23 matches the incoming audio received via the microphone 24. The signal 36 is then fed into the amplifier 32 for playing through the at least one speaker 38. Preferably, the subwoofer 10 is configured to provide that the overall delay accuracy is acceptable, for example less than 5 milliseconds.

Calibration (or synchronization) is preferably accomplished in synchronizing circuitry 26 comprising digital circuitry, a programmed field programmable gate array, or a programmed digital signal processor, that performs a cross correlation of signal 28 from at least one microphone 24, with signal 23 delayed as signal 30. Cross correlation is a well-studied and well-documented mathematical algorithm. Mathematically equivalent techniques such as convolution via application of finite impulse response filters with programmable coefficients may be desirable depending on the specific implementation of synchronizing circuitry 26. The calculated sample number (time) location of the peak of the cross correlation ("X" in 90, relative to "0" delay at 91, in FIG. 6), with sufficient confidence, is used to control digital audio buffer 22, to delay signal 36 to the amplifier and the signal to line out 80, as required.

Figure 6:
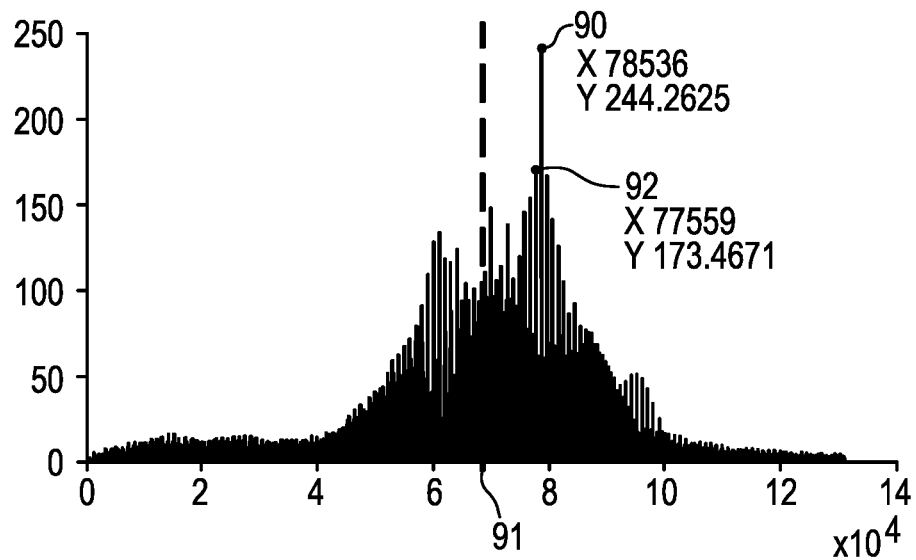
FIG. 6 is a plot of a cross correlation calculation used in calibration (or synchronization) of audio signals.
Figure 7:
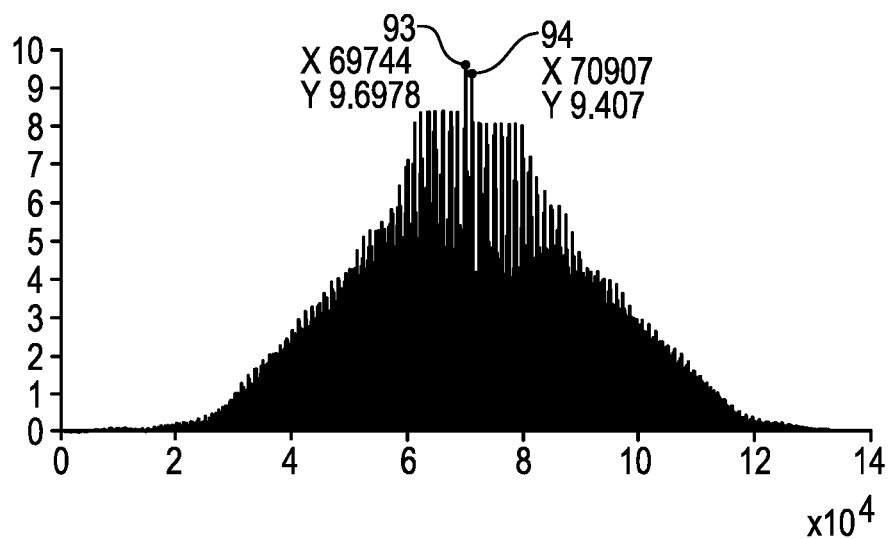
FIG. 7 shows a cross correlation calculation that would not be useful for synchronizing audio signals.

Confidence in calibration is preferably calculated by comparing the "Y" value in 90 and 93 of the peak of the cross correlations in FIGS. 6 and 7, respectively, to the "Y" value in 92 and 94 of the next highest peaks, and also by comparing the peak Y values to the mean Y value of the cross correlation being evaluated. If the peak is sufficiently greater than the next highest peak, and also sufficiently greater than the mean, as exemplified by FIG. 6, the calculation is used to configure the delay. If the peak is not sufficiently greater than the next highest peak, or not sufficiently greater than the mean, with both cases exemplified by FIG. 7, the result is presumed erroneous, discarded, and the calculation is repeated.

Accuracy of calibration is preferably improved by delaying the signal 23 (i.e., using the digital audio buffer 22) before the signal 23 reaches the synchronizing circuitry 26. This yields a more useful signal 30 for the cross-correlation comparison with signal 28 that is subsequently performed by the synchronizing circuitry 26. This delay may be 0, fixed, or calculated from previous calibration attempts.

To further improve the accuracy of calibration, preferably the synchronizing circuitry 26 is configured to both filter and downsample the signals 28 and 30 (i.e. discarding high frequency components by periodically discarding samples). Preferably, the synchronizing circuitry 26 performs low-pass filtering before downsampling, which prevents aliasing (i.e. high frequency components incorrectly appearing as low frequency components). The fact that the synchronizing circuitry 26 periodically discards samples results in the synchronizing circuitry 26 effectively considering longer time duration audio signals, thereby reducing the potential for incorrect calibration.

While some prior art systems perform delay estimation, those prior art systems cluster groups of delay results, achieving an affect similar to averaging individual results, to obtain suitable accuracy. In contrast, the delay estimation disclosed herein is able to obtain suitable accuracy using the previously disclosed calibration accuracy improvement, namely delaying signal 23, and filtering and downsampling signals 28 and 30. The system disclosed herein therefore does not cluster signals or average individual delay results. The system disclosed herein avoids having to do this by having the synchronizing circuitry 26 effectively consider longer audio segments in each delay calculation (i.e., as opposed to having to perform a second level of analysis on delay calculation results).

Preferably, the subwoofer 10 is configured to be battery-operated and therefore, as shown in FIG. 1, includes a battery 42, associated internal power management circuitry 44, and the subwoofer 10 is configured to be charged using an external wall charger 46. Of course, the subwoofer 10 can instead (or in addition) be configured to be hard-wired, such as to the power system of an automobile.

Instead of a single Bluetooth transmitter 18, additional Bluetooth transmitters (represented by dots 48 in FIG. 1) can be provided as receiving signals 49 from the signal processor 14 such that the subwoofer 10 is configured to simultaneously connect (and transmit) to multiple Bluetooth speakers, such as to create a 5.1 surround system.

Instead of, or in addition to, providing signals 36 to the amplifier 32 for driving the speaker 38, the digital audio buffer 22 can provide signals to a line out 80 that can be connected to an external active speaker 82, such as to a powered external subwoofer or to an amplifier that is connected to a passive subwoofer. In fact, the amplifier 32 and speaker 38 can be omitted entirely from the device 10 and just the line out 80 be provided. Alternatively, or in addition, an amplifier 83 can be provided inside the device 10 to provide a powered output to amplifier output 85 that can be connected to an external passive speaker 87, such as a passive speaker or subwoofer. Any one or more of these alternatives can be implemented—i.e., internal amplifier 32 and speaker 38, line out 80, internal amplifier 83 and amplifier output 85.

Another embodiment may provide that more than one microphone 24 be provided, as represented by the multiple dots indicated with reference numeral 25, such as to provide for improved noise cancelation.

The portable subwoofer 10 is configured to connect to any Bluetooth device that is capable of streaming audio. Common examples include a mobile phone, tablet, personal computer, etc. In the present disclosure, a mobile phone is merely used as an example.

Figure 2:
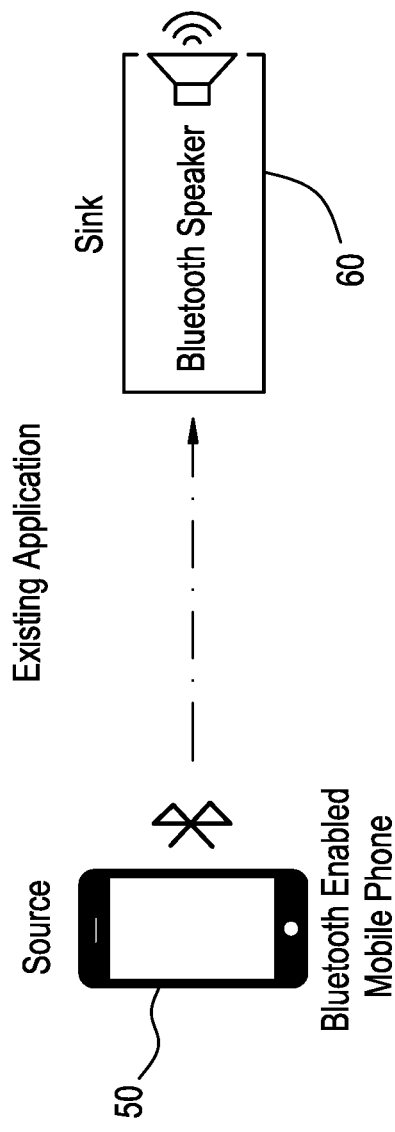
FIG. 2 depicts a standard method of connecting a mobile phone to a Bluetooth speaker.

FIG. 2 depicts a standard method of connecting a mobile phone 50 to a conventional Bluetooth speaker 60. The mobile phone 50 is considered the "source," and the Bluetooth speaker 60 is considered the "sink." Audio data streams from the mobile phone 50 to the Bluetooth speaker 60. The Bluetooth speaker 60 receives the signal, processes it, and amplifies the signal to the speaker, thus creating audio sound.

FIG. 3 illustrates the same solution using the portable subwoofer 10 shown in FIG. 1 and described hereinabove. As shown in FIG. 3, the mobile phone 50 connects to the portable subwoofer 10 via Bluetooth as a "source." The portable subwoofer 10 is a "sink" to the mobile phone 60, and is also a "source" to the Bluetooth speaker 60. The Bluetooth speaker 60 is a "sink" relative to the portable subwoofer 10. Essentially, the portable subwoofer 10 is configured to receive the audio signal from the mobile phone 50, process the signal, route the low frequencies to the internal amplifier 32 (see FIG. 1) which powers the internal subwoofer loudspeaker 38 (see FIG. 1), and route the mid and high frequencies to the "source" portion which is then effectively broadcast to the Bluetooth speaker 60 (see FIG. 3). Both portable subwoofer 10 and Bluetooth speaker 60 are synchronized (i.e., using the at least one microphone 24 and the synchronizing circuitry 26 shown in FIG. 1) such that the sound being emitted will not have audible delays.

When pairing to a portable Bluetooth speaker 60, the portable subwoofer 10 must be positioned within range of the source mobile phone 50 and the Bluetooth speaker 60. The user will then pair the mobile phone 50 to the portable subwoofer 10 via Bluetooth. The portable subwoofer 10 will pair to the Bluetooth speaker 60, and once connected, the user will stream audio through their mobile phone 50.

The portable subwoofer 10 may be configured to use a Class 2 Bluetooth power level, which is currently the most common class for Bluetooth audio products. Its range is typically about ten meters or thirty-two feet. Alternatively, the portable subwoofer 10 may be configured to work in other classes, such as a Class 1 Bluetooth power level.

Figure 4:
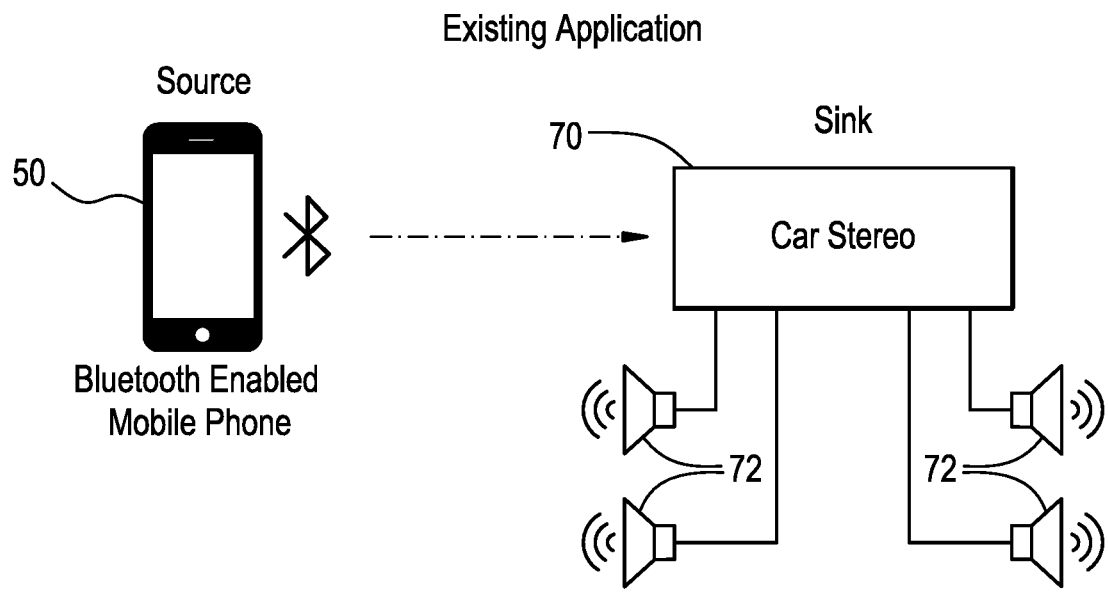
FIG. 4 depicts a standard method of connecting a mobile phone to a Bluetooth enabled car radio (aka "head unit")

FIG. 4 depicts a standard method of connecting a mobile phone 50 to a conventional Bluetooth enabled car radio (aka "head unit") 70. The mobile phone 50 is considered the "source," and the head unit 70 is considered the "sink." Audio data streams from the mobile phone 50 to the head unit 70. The head unit 70 receives the signal, processes it, and amplifies the signal to the speakers 72 in the car, thus creating audio sound.

FIG. 5 illustrates the same solution using the portable subwoofer 10 shown in FIG. 1 and described hereinabove. As shown in FIG. 5, the mobile phone 50 connects to the portable subwoofer 10 via Bluetooth as a "source." The portable subwoofer 10 is a "sink" to the mobile phone 50, and is also a "source" to the car stereo (i.e., the head unit) 70. The head unit 70 is a "sink" relative to the portable subwoofer 10. Essentially, the portable subwoofer 10 is configured to receive the audio signal from the mobile phone 50, process the signal, route the low frequencies to the internal amplifier (32 in FIG. 1) which powers the internal subwoofer loudspeaker (38 in FIG. 1), and route the mid and high frequencies to the "source" portion which is then effectively broadcast to the head unit 70. Both portable subwoofer 10 and head unit 70 are synchronized (i.e., using the at least one microphone 24 and synchronizing circuitry 26 shown in FIG. 1) such that the sound being emitted will not have audible delays.

When pairing to a car stereo 70, the portable subwoofer 10 would be set within range of the source mobile phone 50 and the car stereo 70. The user will pair the mobile phone 50 to the portable subwoofer 10 via Bluetooth, and the portable subwoofer 10 will pair to the car stereo 70. Once connected the user will stream audio through their mobile phone.

The portable subwoofer 10 preferably has similar features as existing subwoofers in order to 'tune' the sound levels to match the environment or product it is paired to. This preferably includes, for example, volume levels, cross over frequency, and phase.

The portable subwoofer 10 is also configured to synchronize the sound with the other audio device (a portable Bluetooth speaker, car stereo, etc.) so the user will hear the music without any delay between the low frequencies from the portable subwoofer 10, and the mid/high frequencies from the other audio device.

The portable subwoofer 10 is configured to pair via Bluetooth from any device capable of streaming Bluetooth audio and act as the "sink." The portable subwoofer 10 is also configured to pair via Bluetooth to other audio equipment capable of streaming Bluetooth audio and act as the "source."

The portable subwoofer 10 is also preferably configured to filter the audio signal output to "split" the signals in two streams. One which will be low frequencies to the portable subwoofer 10, the other will wirelessly stream to the other device intended for the mid and high frequencies.

The portable subwoofer 10 is also preferably configured to synchronize the audio signal going to the portable subwoofer 10 and the unit playing mid/high frequencies such that the user will not hear delays between the two units playing the audio stream.

Preferably, the portable subwoofer 10 is configured to be portable in which the size and weight is small enough for a person to carry, is portable in which it operates with rechargeable batteries inside the unit, thus not needing any other power source such as AC outlet, or automobile power system.

To enhance existing audio systems that do not have sufficient bass, such as portable Bluetooth speakers, and car stereos without subwoofers, the portable subwoofer 10 is able to accomplish this with the ability to pair to a device capable of streaming Bluetooth audio such as a mobile phone, split the audio such that the portable subwoofer 10 will produce louder bass and send the mid/high frequencies to the existing audio system to create a fuller sound. It is portable by not just size and weight, but also because the unit is battery powered and does not need an AC outlet or power direct from an automobile to operate.

Although the present disclosure is directed to Bluetooth as being the standard of wireless communication used by the device and systems disclosed herein, the device and related systems can be configured to receive and transmit data using other standards and frequencies, such as future standards, while still staying very much within the scope of the present invention.

Furthermore, while the device has been described as being a subwoofer, the device can be provided as being, for example, a full range speaker which is capable of producing lows, highs and mid frequencies. As such, the "at least one speaker" 38 disclosed herein can actually be multiple speakers, such as three speakers, wherein the signal processor 14 is configured to send different frequencies to different amplifiers associated with different speakers.

While the foregoing description emphasized Bluetooth, it should be understood that the present invention is not limited to that wireless standard and the present invention can, instead, be configured to work with other wireless standards.

While specific embodiments of the invention have been shown and described, it is envisioned that those skilled in the art may devise various modifications without departing from the spirit and scope of the present invention.

What is claimed is:

1. A portable device comprising: a wireless sink; a signal processor; a wireless source; at least one microphone configured to receive audio from outside the portable device; at least one of at least one speaker and a line out, wherein the device is configured to receive a wireless signal using the wireless sink, process the signal using the signal processor, and transmit a wireless signal using the wireless source depending on what audio is received from the at least one microphone, wherein the portable device is configured to at least one of emit sound using the at least one speaker and provide signals to the line out depending on what audio is received from the at least one microphone, wherein the portable device further comprises a digital audio buffer configured to delay at least one of the emitted or line out signals according to calibration performed by synchronizing circuitry configured to receive signals from both the at least one microphone of the portable device and the digital audio buffer, wherein the synchronizing circuitry employs cross correlation to effect calibration of the delay, after filtering and downsampling signals received from the at least one microphone of the portable device and the digital audio buffer; wherein the portable device comprises a first input wherein the portable device receives the wireless signal using the wireless sink, comprises a second input wherein the portable device receives sound from outside the portable device using the at least one microphone, and uses the sound received from outside the portable device by the at least one microphone to calibrate the delay.

2. The portable device as recited in claim 1, wherein the portable device avoids having to cluster signals or average individual delay results as a result of the synchronizing circuitry considering longer audio segments in each delay calculation.

3. The portable device as recited in claim 1, wherein the synchronizing circuitry performs low-pass filtering before downsampling.

4. The portable device as recited in claim 1, wherein the fact that the synchronizing circuitry downsamples results in the synchronizing circuitry considering longer time duration audio segments, thereby reducing the potential for incorrect calibration.

5. The portable device as recited in claim 1, wherein the wireless sink comprises a wireless signal receiver.

6. The portable device as recited in claim 1, wherein the wireless sink comprises a Bluetooth signal receiver.

7. The portable device as recited in claim 1, wherein the wireless source comprises a wireless signal transmitter.

8. The portable device as recited in claim 1, wherein the wireless source comprises a Bluetooth signal transmitter.

9. The portable device as recited in claim 1, further comprising an amplifier, wherein the digital audio buffer is configured to receive signals from the synchronizing circuitry and provide signals to the amplifier, said amplifier being configured to drive said at least one speaker to produce sound.

10. The portable device as recited in claim 1, wherein the portable device is configured to change an added delay if, after comparing peaks of the cross correlation of signals received by the synchronizing circuitry, it is determined that a highest peak is sufficiently greater than a next highest peak, and also sufficiently greater than a mean of the cross correlation of the signals received by the synchronizing circuitry.

11. The portable device as recited in claim 1, wherein the portable device is configured to not change an added delay and instead repeat a calculation if it is determined that the highest peak of the cross correlation is not sufficiently greater than the next highest peak, or not sufficiently greater than the mean.

12. The portable device as recited in claim 1, wherein the portable device is configured to improve an accuracy of calibration by delaying the leading signal used in the cross correlation calculation.

13. The portable device as recited in claim 1, further comprising at least one user-interactive control connected to the signal processor and configured to be adjustable.

14. The portable device as recited in claim 1, further comprising a battery, and internal power management circuitry associated with the battery.

15. A method of using a portable device to synchronize sound, said method comprising: providing said portable device, said portable device comprising a wireless sink, a signal processor, a wireless source, at least one microphone configured to receive audio from outside the portable device, and at least one of at least one speaker and a line out; using the wireless sink to receive a wireless signal; using the signal processor to process the signal; using the wireless source to transmit a wireless signal depending on what audio is received from the at least one microphone of the portable device; at least one of using the at least one speaker to emit sound depending on what audio is received from the at least one microphone and sending signals to the line out depending on what audio is received from the at least one microphone of the portable device; using a digital audio buffer to delay the emitted sound or line out according to calibration performed by synchronizing circuitry; and using synchronizing circuitry to receive signals from both the at least one microphone of the portable device and a digital audio buffer, wherein the synchronizing circuitry employs cross correlation to effect calibration of the delay of the emitted sound or line out, after filtering and downsampling signals received from the at least one microphone and the digital audio buffer, having the portable device use a first input wherein the portable device receives the wireless signal using the wireless sink, use a second input wherein the portable device receives sound using the at least one microphone and uses the sound received from the at least one microphone to calibrate the delay.

16. A portable device comprising: a wireless sink; a signal processor; a wireless source; at least one microphone configured to receive audio from outside the portable device; at least one of at least one speaker and a line out, wherein the device is configured to receive a wireless signal using the wireless sink, process the signal using the signal processor, and transmit a wireless signal using the wireless source depending on what audio is received from the at least one microphone, wherein the portable device is configured to at least one of emit sound using the at least one speaker and provide signals to the line out depending on what audio is received from the at least one microphone, wherein the portable device further comprises a digital audio buffer configured to delay at least one of the emitted or line out signals according to calibration performed by synchronizing circuitry configured to receive signals from both the at least one microphone and the digital audio buffer, wherein the synchronizing circuitry employs cross correlation to effect calibration of the delay, after filtering and downsampling signals received from the at least one microphone and the digital audio buffer, wherein the portable device is configured to change an added delay if, after comparing peaks of the cross correlation of signals received by the synchronizing circuitry, it is determined that a highest peak is sufficiently greater than a next highest peak, and also sufficiently greater than a mean of the cross correlation of the signals received by the synchronizing circuitry.

17. The portable device as recited in claim 16, further comprising an amplifier, wherein the digital audio buffer is configured to receive signals from the synchronizing circuitry and provide signals to the amplifier, said amplifier being configured to drive said at least one speaker to produce sound.

18. The portable device as recited in claim 16, wherein the portable device is configured to not change an added delay and instead repeat a calculation if it is determined that the highest peak of the cross correlation is not sufficiently greater than the next highest peak, or not sufficiently greater than the mean.

* * * * *